United States Patent
Beisemann

[15] 3,640,590
[45] Feb. 8, 1972

[54] MEANS UTILIZING COMPRESSED AIR FOR CONFINING A PRESSURIZED OIL FILM BETWEEN RELATIVELY MOVABLE BEARING SURFACES

[72] Inventor: Manfred Beisemann, Essen, Germany
[73] Assignee: P. Koning Machinefabriek, Swalmen, Netherlands
[22] Filed: Aug. 12, 1969
[21] Appl. No.: 849,369

[30] Foreign Application Priority Data
Aug. 13, 1968 Germany ...................... P 17 75 454.0
Nov. 16, 1968 Germany ...................... P 18 09 350.0

[52] U.S. Cl. ...................... 308/9, 308/5, 74/424.8
[51] Int. Cl. ...................... F16c 17/16
[58] Field of Search ............ 308/9, 5, 122, 363; 74/459, 74/424.8, 409, 410

[56] References Cited

UNITED STATES PATENTS

| | | | |
|---|---|---|---|
| 3,447,840 | 6/1969 | Gress, Jr. | 308/5 |
| 2,663,977 | 12/1953 | Gerard | 308/9 X |
| 3,183,732 | 5/1965 | Porath | 74/424.8 |
| 3,476,444 | 11/1969 | Dunfee | 308/5 X |

Primary Examiner—Martin P. Schwadron
Assistant Examiner—R. H. Lazarus
Attorney—Herbert E. Kidder and Peter H. Firsht

[57] ABSTRACT

A pressurized oil film is built up in a region between relatively movable bearing surfaces by means including a pressurized oil supply line and an oil return line. Compressed air is caused to impinge on the edges of the oil film region to provide a pneumatic pressure threshold for confining the extent of the region and preventing leakage of the oil.

10 Claims, 14 Drawing Figures

PATENTED FEB 8 1972

INVENTOR.
MANFRED BEISEMANN
BY
Peter H. Firsht
ATTORNEY

MEANS UTILIZING COMPRESSED AIR FOR CONFINING A PRESSURIZED OIL FILM BETWEEN RELATIVELY MOVABLE BEARING SURFACES

BACKGROUND OF THE INVENTION

The present invention relates to the maintenance of a pressurized oil film between bearing surfaces, and more particularly to a method and means employing a pneumatic pressure seal for confining a pressurized oil film to a desired region and preventing leakage of oil therefrom.

The principle of hydrostatic pressure buildup in narrow gaps has been known for a long time and is used successfully for hydrostatic guide paths, hydrostatic radial and axial bearings and also for hydrostatic spindle nut systems. The known method consists in building up a pressure resistant oil film, which is also maintained on fluctuations in the load, between the bearing surfaces of parts which are movable in relation to each other. Thus, direct contact of the two bearing surfaces with each other is prevented, and accordingly all wear is avoided. Also, friction losses are greatly reduced, so that the drive forces can be kept small. Moreover, a hardening of the guide path and lining the counter guides with an expensive guide material becomes superfluous.

The prior method, however, has the disadvantage that oil leaks occur at the edges of the bearing surfaces and flows freely therefrom. The leakage oil is allowed to flow into catching bowls or troughs, from whence, after careful filtering, it is again supplied to the oil cycle. Needless to say, such a method is costly structurally and operationally, and is unsatisfactory.

To overcome this disadvantage, conventional seals are used to prevent the leakage of oil. As a result, many advantages of the hydrostatic guide are, of course, lost. For example, friction losses are increased, freedom from wear is no longer provided, and the inner return of the leakage oil is effective only for the life of the seals causing the friction.

SUMMARY OF THE INVENTION

The prior art problem solved by the present invention is to seal off the oil film region from the outside air, practically without friction. The flow of the leakage oil to the outside and entry of impurities into the oil film region is thus prevented.

The problem is solved in accordance with the present invention by building up a pressurized oil film region between the bearing surfaces and surrounding the oil film region with a pneumatic pressure threshold continuously maintained at a higher pressure than the oil pressure at the edge of the oil film region. Since the oil cannot overcome the pressure of the pneumatic pressure threshold, preferably maintained by means of compressed air, it cannot flow to the outside, but flows instead with a portion of the compressed air back to the oil container. In practically all cases coming to hand, the pressurized oil supply line is surrounded by an oil return line, for instance an oil return groove or the like, so that the oil flowing between the bearing surfaces flows away on all sides and the oil pressure in the oil return line reaches a level which, on account of the friction of the oil in the return lines, is only slightly above atmospheric pressure. Therefore, the pressure of the pneumatic pressure threshold needs to be only of such value that it slightly exceeds the pressure in the oil return line.

The method in accordance with the present invention permits simple and sure inner return of the oil to the oil container, via standard conduits. As a result, expensive catching shelves and troughs for the machine parts can be omitted.

The method in accordance with the present invention can, for instance, find application in connection with a hydrostatic guide path having a guide surface which is movable on a flat counter surface and a groove for the supply of pressurized oil formed in the guide surface, a closed oil return groove surrounding this groove for the supply of the pressurized oil. The present invention is characterized in that the groove for the return of oil is surrounded by an oil seal groove which is subjected to pneumatic pressure.

A further device for carrying out the method in accordance with the present invention consists in a hydrostatic radial bearing, having a smooth surface shaft rotatably carried in a hollow cylinder, the inner surface of the hollow cylinder having a radially formed, optionally interrupted groove for the supply of pressurized oil, and in axial spacing thereto on either side in each case a closed, radially arranged oil return groove. This device is characterized in that on the side of the oil return grooves turned away from the pressure oil supply groove, there are radial, closed oil seal grooves in axial spacing, subjected to pneumatic pressure.

Another device for carrying out the method in accordance with the present invention consists in a hydrostatic axial bearing having a stationary and a rotatable bearing path and an annular groove provided in the stationary bearing half, optionally interrupted, for the supply of pressure oil, and having annular oil return grooves on both sides surrounding this annular groove. The hydrostatic axial bearing is characterized in that on the sides of the oil return grooves turned away from the annular groove, oil seal grooves are arranged annularly and subjected to pneumatic pressure.

Still another device for carrying out the method in accordance with the present invention consists in a hydrostatic nut having a spindle inserted in this nut, the contact surfaces being formed by the screw thread flanks of the internal screw thread of the nut and the external screw thread of the spindle. This device is characterized in that the oil film region is surrounded on both sides by an annular oil seal groove provided in the inner opening of the hydrostatic nut and subjected to pneumatic pressure.

In accordance with a further characteristic of the present invention, the pneumatic pressure medium is applied to the oil seal grooves through a longitudinal bore formed in the hydrostatic nut and having tap lines leading transversely to the oil seal grooves.

In accordance with a further development of the hydrostatic nut, the present invention provides that at the ends of the oil film region in each case in front of the oil seal grooves, annular oil catching chambers are provided, which are in communication with the oil return bore. By this measure, care is taken that the pressurized oil flows away substantially via the oil catching chambers, and the oil seal grooves merely have to prevent an issuing of leakage oil.

The present invention also provides a plurality of axial supply channels in the hydrostatic nut, connected to at least one common pressure oil supply line, for the supply of the pressure oil via branch channels to capillary throttles, the supply channels being connected via a distributor annular channel in the basic body of the nut and the pressurized oil supply connection piece being connected to one of the supply channels. By this arrangement pressurized oil can be supplied to the capillary throttles through supply channels arranged opposite each other in the axial direction, and only one connection piece is necessary for the pressure oil supply from the outside.

If both screw thread flanks are to be supplied with oil pressure independently of each other, a corresponding number of distributor annular channels is necessary. Accordingly, the present invention provides for a plurality of supply channels, in each case connected to a common pressurized oil supply, for the separate supply of the pressurized oil to opposite oil pockets. In each case only one supply channel is connected to the pressurized oil supply, the remaining supply channels being closed at the end and being in communication, via distributor annular channels, with the supply channels connected to the oil supply line.

In this connection it has been found to be particularly expedient to arrange the distributor annular channel or channels in the outer periphery, covered by a bushing on the hydrostatic nut.

In accordance with a further characteristic of the present invention, there is also the possibility of arranging the distributor annular channel or channels in a bushing surrounding the nut.

Furthermore, in particular with the hydrostatic nut, it has been found that throttling of the oil pressure in the helically arranged circulating capillary throttles causes an increase in temperature of the pressurized oil. This leads to an increase in the viscosity of the oil and thereby to a change in lubrication properties. To avoid this disadvantage, the present invention provides cooling channels, through which a cooling agent may be passed, arranged parallel to the capillary throttles.

The present invention further proposes that the supply channels used for supplying the pneumatic pressure medium, the pressurized oil and cooling agent, as well as the corresponding withdrawal channel, be axially arranged, and that the connections to the corresponding supply lines be arranged on a flange which is provided on one end of the hydrostatic nut.

In order to prevent putting any obstacle in the path of the spindle by the supply lines, and also to prevent any damage to the spindle in assembly, the present invention furthermore provides that the connection pieces be arranged radially to the flange. For increasing the rigidity of the construction, it is moreover expedient for the flange and the nut to be of one-piece construction. The one-piece construction is also advisable for the supply of the separate media (pressurized oil, cooling agent, compressed air) to the supply channels, since in this case no sealing problems occur between the flange and the basic body of the nut.

Finally, the present invention proposes that the transverse channels leading from the capillary throttles to the oil pockets should be passed through the bushing to the outside, and that these openings should be capable of being closed by stoppers; pressure measurement equipment being insertable in these openings with the stoppers removed. In this manner it is possible to undertake the determination of the pressure ruling in the bearing pockets at the screw thread flanks.

DESCRIPTION OF EMBODIMENTS

Figure 1:
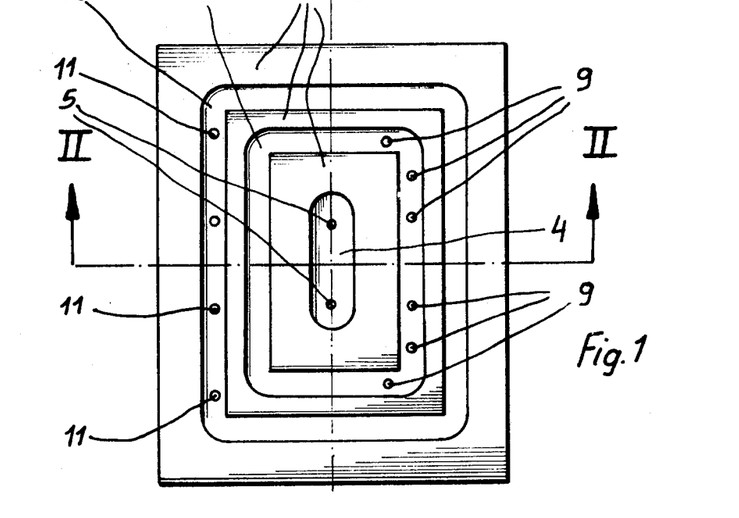
FIG. 1 is a top plan view of the guide surface of a hydrostatic guide path.
Figure 2:
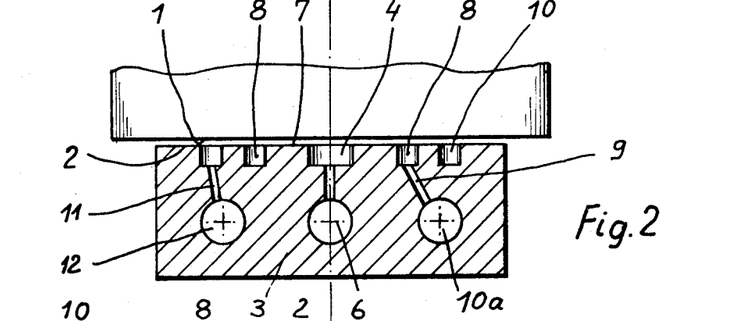
FIG. 2 is a section along line II—II in FIG. 1 diagrammatically illustrating a counter surface.

Illustrated in FIGS. 1 and 2 is a hydrostatic guide path having a flat surface 1 movable relative to a surface 2 on a block 3. Approximately in the middle of the block 3 there is provided an oil supply groove 4, through which pressurized oil is supplied via bores 5 and an oil line 6 from an oil pump (not shown). The oil flows through a gap 7 between the surfaces 1 and 2 to a closed oil return groove 8 surrounding the oil supply groove 4, and from there via bores 9 and a line 10a back to the pump (not shown).

Also formed in the surface 2 of the block 3 is an oil seal groove 10, which surrounds the oil return groove 8. The oil seal groove 10 is subjected to impingement with compressed air delivered via bores 11 and a compressed air line 12.

Figure 3:
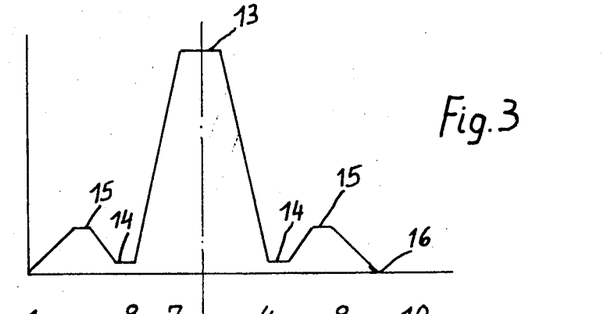
FIG. 3 is a diagram or chart of the pressure ratios in the arrangement in accordance with FIG. 2.

The pressure ratios of the arrangement illustrated in FIG. 2 are represented by the diagram or chart shown in FIG. 3. The maximum 13 of the oil pressure lies in the region of the oil supply groove 4. The oil pressure then falls away rapidly in the direction of the oil return groove 8, and therein reaches a pressure 14 which corresponds approximately to atmospheric pressure. A pneumatic pressure threshold 15, produced by the pneumatic pressure of the compressed air impingement of the oil seal groove 10, has its maximum above the oil seal groove 10 and then falls away outwardly to atmospheric pressure 16 and inwardly to the pressure 14 at the oil return groove 8. Accordingly, the pressure of the oil cannot exceed the pneumatic pressure threshold 15 which surrounds the oil film region on all sides, and the oil therefore flows away via the bores 9, together with the inwardly flowing compressed air.

The supply and withdrawal of the pressurized oil, as well as the compressed air supply, take place in the arrangements shown in FIGS. 4 to 7 in the same manner as with the arrangement which has just been described. These Figures are therefore highly schematic, for simplicity's sake, and merely illustrate the main construction.

Figure 4:
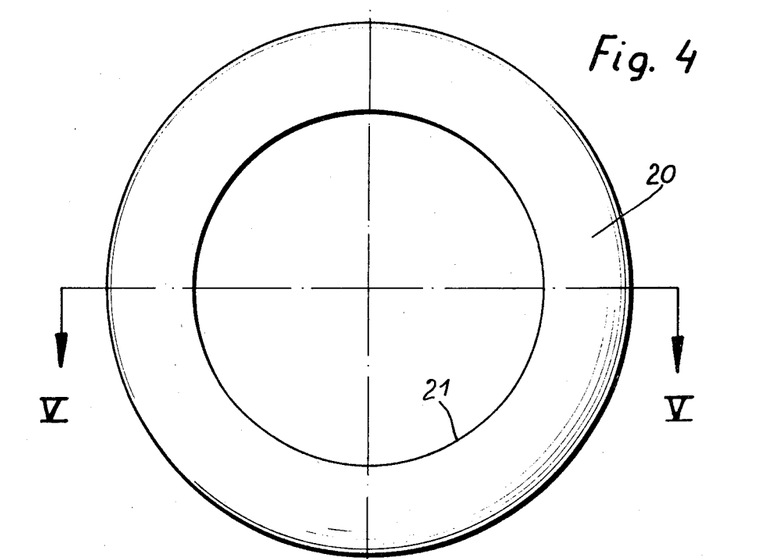
FIG. 4 is an end view of a radial bearing diagrammatically illustrated.
Figure 5:
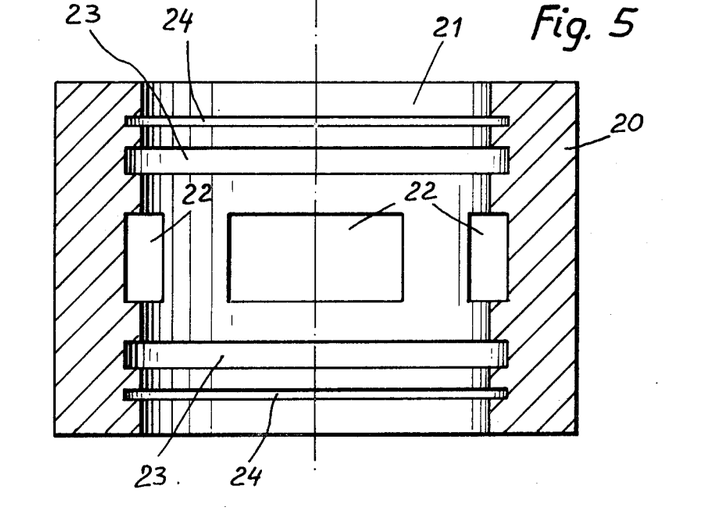
FIG. 5 is a vertical sectional view along line V—V in FIG. 4.

FIG. 4 and FIG. 5 show a hydrostatic radial bearing including a hollow cylinder 20 having an inner surface 21 formed with oil supply grooves 22 and serving as a bearing surface for a shaft (not shown). The oil supply grooves 22 are radially arranged, whereby provision is made for supplying the bearing surface with oil from several pressurized oil sources, independently of each other. On both sides of the oil supply grooves 22, in axial spacing therefrom, are oil supply grooves 23, and oil seal grooves 24 which are impinged on with pneumatic pressure. The pressure distribution in this radial bearing and also the function of the arrangement correspond substantially to the hydrostatic guide path of FIGS. 1 to 3.

Figure 6:
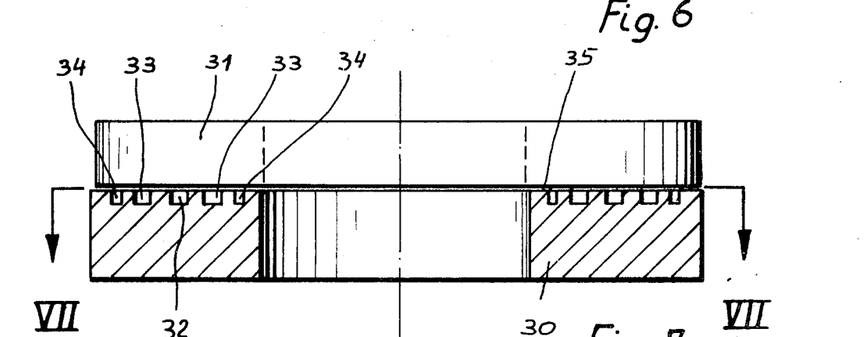
FIG. 6 is a side view, partly in section, of an axial bearing in diagrammatic representation.
Figure 7:
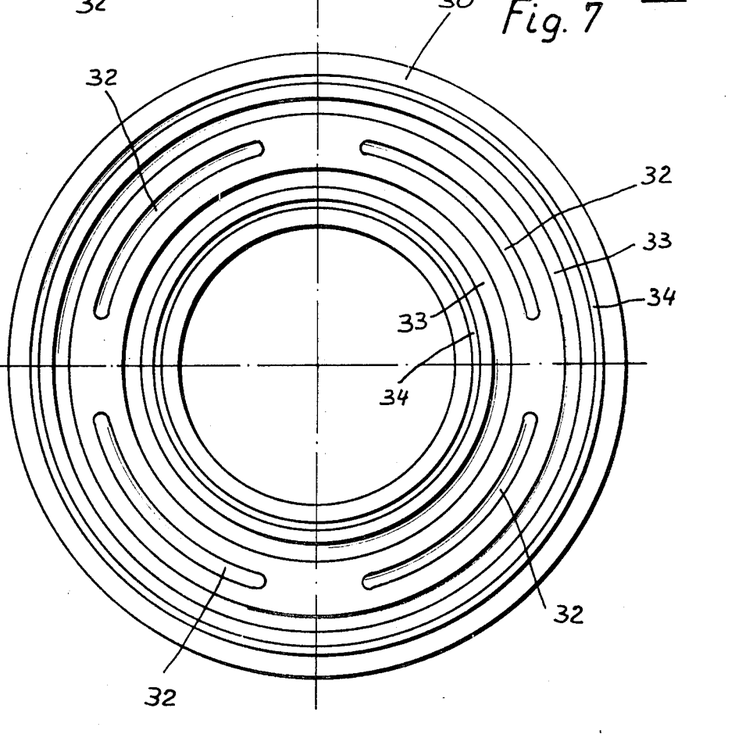
FIG. 7 is a view along the line VII—VII in FIG. 6, the representation here again being diagrammatic.

In FIGS. 6 and 7, a hydrostatic axial bearing is shown having a stationary circular bearing half 30 and a rotatable circular bearing half 31 provided with bearing surfaces 35. Grooves 32 for the supply of pressurized oil are provided in the bearing half 30 midway thereof. The grooves 32 are surrounded on both sides by concentric annular oil return grooves 33, and annular oil seal grooves 34 impinged on with pneumatic pressure.

The pressurized oil is forced through the grooves 32 between the bearing surfaces 35 to the oil return grooves 33 and from there is passed back again to the oil pump. The leakage of oil is prevented by the pneumatic pressure threshold present in the region of the oil seal grooves 34. The pressure buildup in this axial bearing again corresponds substantially to the illustration in FIG. 3.

Figure 8:
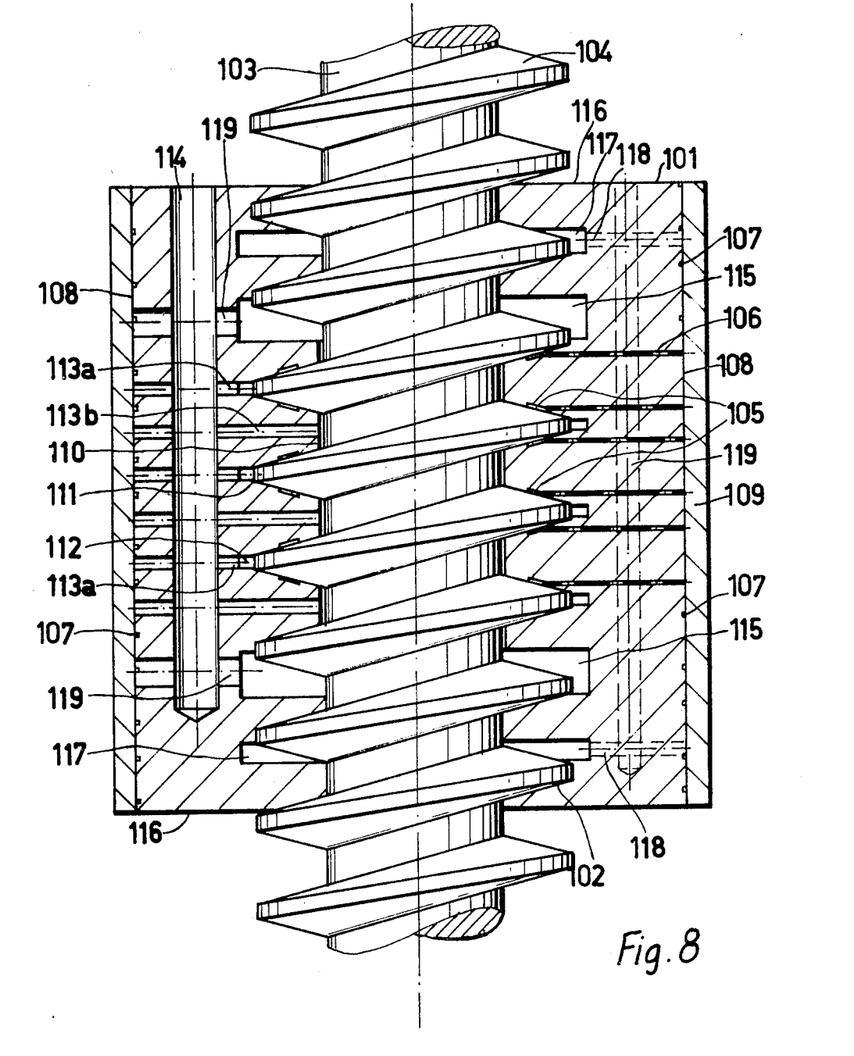
FIG. 8 is a fragmentary elevational view of a spindle inserted in a hydrostatic nut shown in section.

The hydrostatic nut 101 shown in FIG. 8 has a conical internal screw thread 102, in which a spindle 103 having conical external screw threads 104 is inserted. On the flanks of the internal screw thread 102, oil pockets 105 are provided, which are supplied with pressurized oil via cross channels 106 provided in the nut 101. The supply of the pressurized oil to the cross channels takes place via helically circulating capillary throttles 107, which are supplied with pressurized oil via supply channels, which are not shown, from a pump (not shown).

The capillary throttles 107 consist of grooves formed in the outer longitudinal sides 108 of the nut 101, which are surrounded by a bushing 109 sealingly surrounding the sides 108.

The nut 101 is provided with screw thread heads 110 and screw thread foot pieces 111 and the pressurized oil issuing from the oil pockets 105 forms a pressure resistant oil film between the bearing surfaces formed by the screw thread flanks of the internal screw thread 102 and of the external screw thread 104. The pressurized oil flows from there partially to the screw thread foot pieces 111. Grooves 112 are provided in the screw thread foot pieces 111, from which the pressurized oil, via cross channels 113a, flows to an oil return bore 114 arranged lengthwise in the nut 101, which is connected to an oil-catching container.

The pressurized oil flowing to the screw thread heads 110 is in the same manner passed to the oil return bore 114 via cross channels 113b. Annular oil-catching chambers 115 are provided at the end of the oil film region, which likewise are in connection with the oil return bore 114.

In order to prevent an issue of oil to the ends 116 of the nut 101 via the oil-catching chambers 115, an annular oil seal groove 117 is provided between the chambers 115 and the ends 116. These oil seal grooves 117 are connected via tap or branch lines 118 to a longitudinal bore 119 which is connected to a pneumatic pressure source (not shown). In this manner, a pneumatic pressure is always maintained in the oil seal grooves. Since, as a result of the relatively large oil-catching chambers, the pressurized oil flowing in the direction of the oil seal grooves reaches practically atmospheric pressure, the pneumatic pressure threshold achieved through the oil seal grooves merely has to have a pressure such that the pneumatic pressure is somewhat greater than the oil pressure which occurs there.

In the further embodiment of the hydrostatic nut, shown in FIGS. 9 to 14, for the purpose of clarity the paths corresponding to the illustration of FIG. 8 bear the same reference numerals. For greater clarity, however, the parts illustrated there are again explained in interrelation.

The hydrostatic nut 101 has a conical internal screw thread 102, in which a spindle 103 having conical external screw thread 104 is inserted. Oil pockets 105 are provided on the flanks of the internal screw thread 102, which are supplied with pressurized oil via cross channels 106 provided in the nut 101. The supply of the pressurized oil to the cross channels 106 takes place via capillary throttles 107, to which the pressure oil is supplied via the supply channels 120, 120a, 120b and 120c or 129, 129a, 129b and 129c, as well as branch channels 133.

The capillary throttles 107 consist of grooves made in the outer longitudinal sides 108 of the nut 101, which are surrounded by a bushing 109 sealingly surrounding the sides 108.

The pressurized oil issuing from the oil pockets 105 in the direction of the screw thread heads 110 and the screw thread foot pieces 111 of the nut 101, the original pressure of which has been reduced by the capillary throttles 107, forms a pressure resistant oil film between the bearing surfaces formed by the screw thread flanks of the internal screw thread 102 and of the external screw thread 104. The oil flows from there partially to the screw thread foot pieces 111. Continuous grooves 112 are provided in the screw thread foot pieces 111, from which the oil, via cross channels 113a, flows to an oil return bore 114 arranged along the nut 101, or to an oil return bore 114a (FIG 11 and FIG. 13), which are connected to an oil-catching container, which is not shown.

Figure 11:
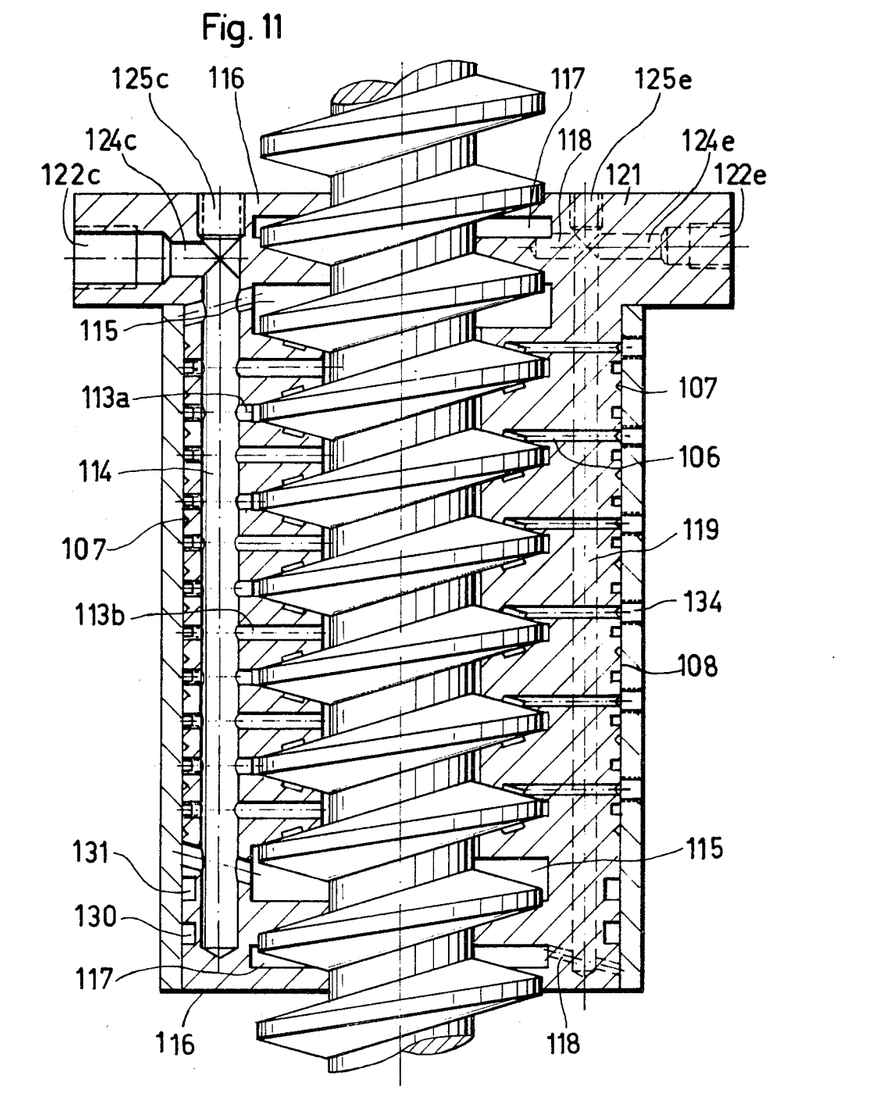
FIG. 11 is a sectional view in accordance with FIG. 9, the section plane again being turned, and an oil return channel being visible.
Figure 12:
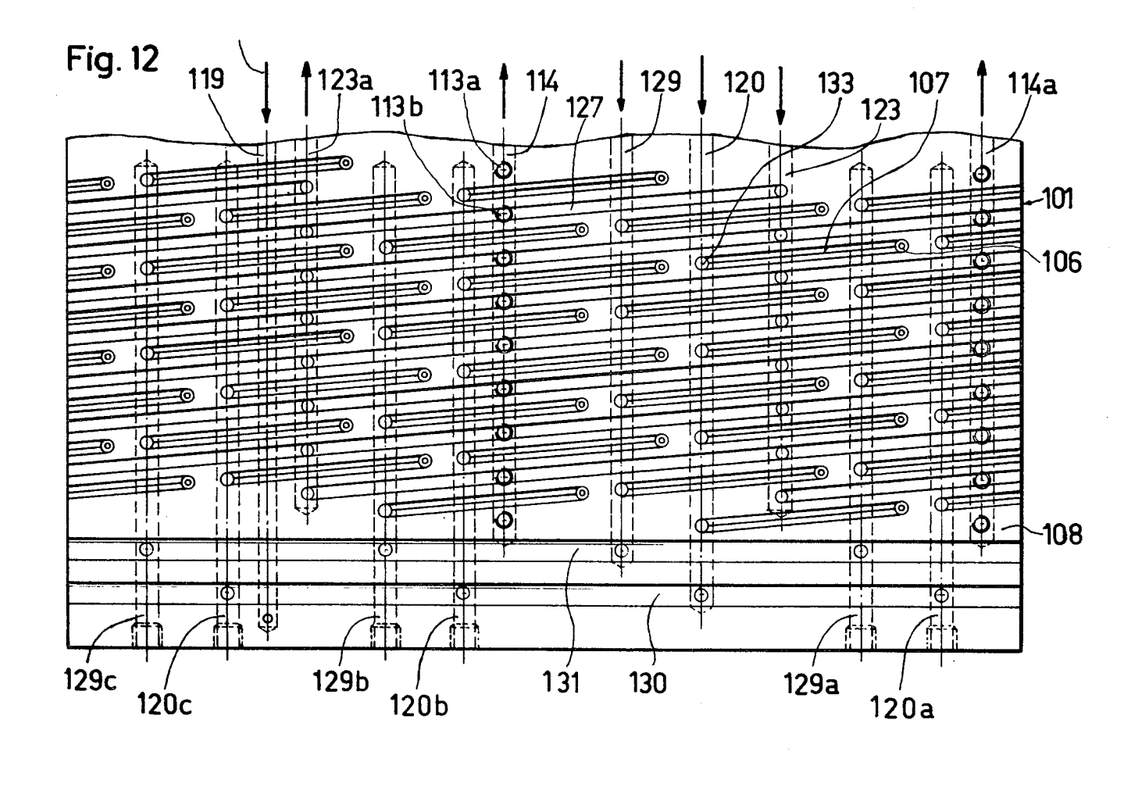
FIG. 12 is a complete projection of the outer longitudinal side of the nut with the bushing omitted and showing the cooling system.
Figure 13:
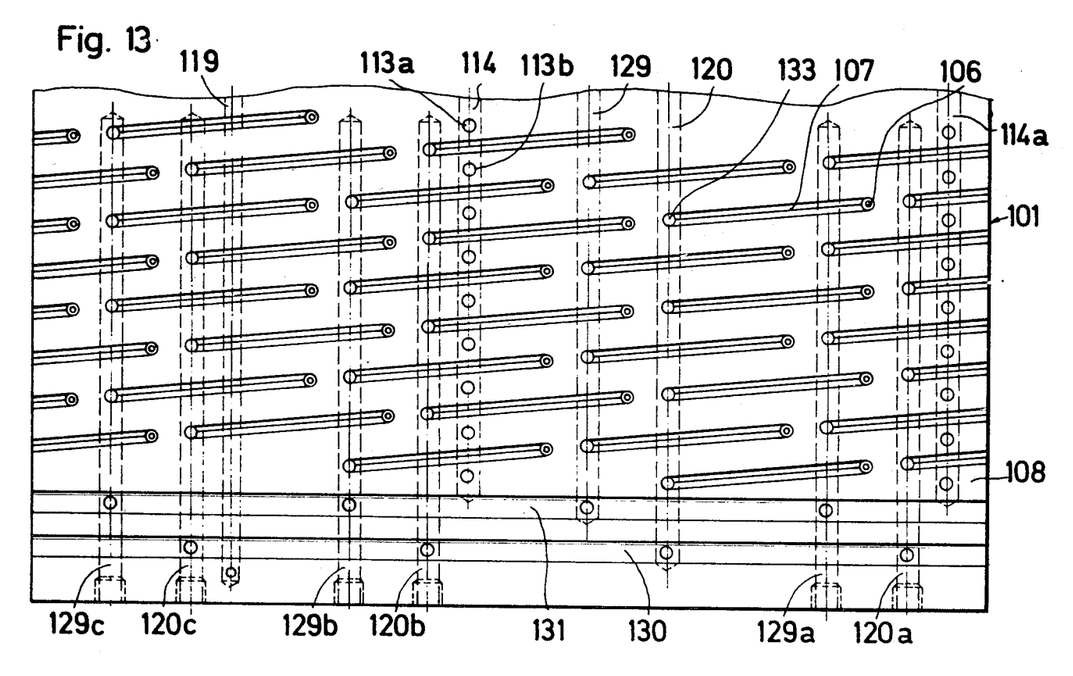
FIG. 13 is a view similar to FIG. 12, but without the cooling system.

The oil flowing to the screw thread heads 110 is in the same way passed via cross channels 113b likewise to the oil return bores 114 or 114a. Annular or catching chambers 115 are provided at the ends of the oil film region, which likewise are in connection with the oil return bores 114 or 114a.

Figure 9:
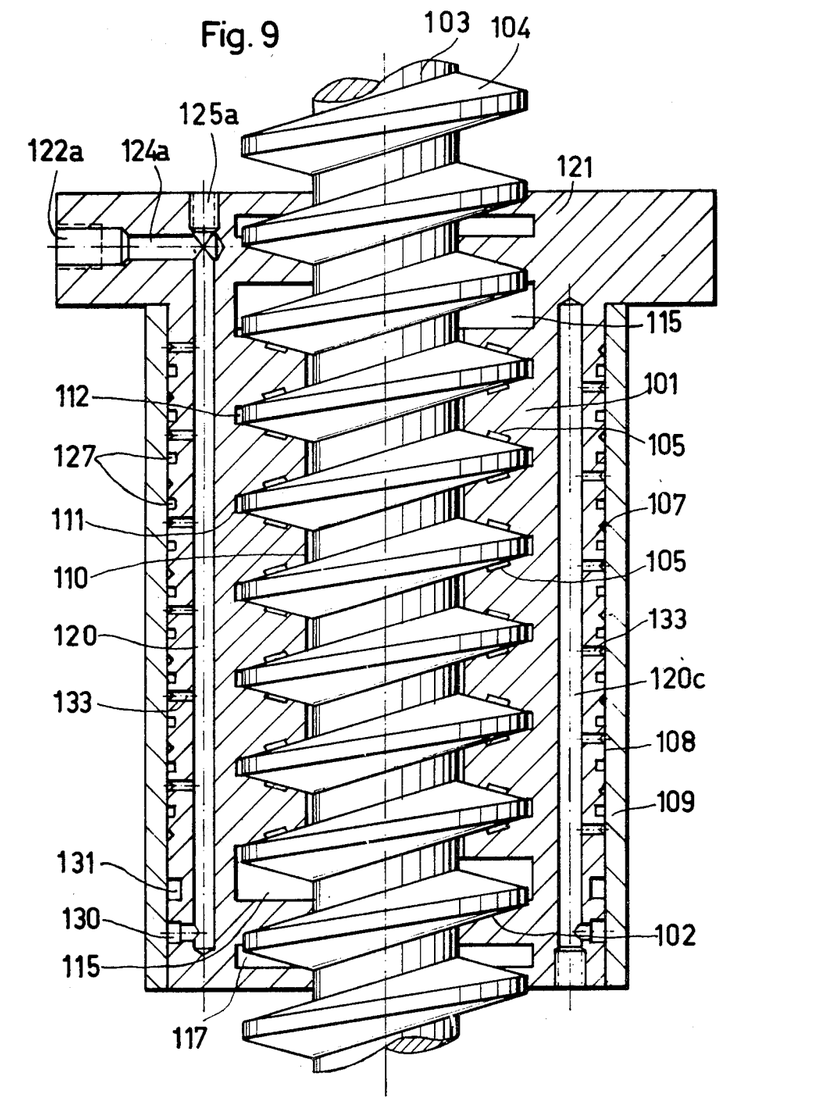
FIG. 9 is a sectional view of a modified form of hydrostatic nut, a spindle inserted in this nut, and showing the supply channels for the pressurized oil.
Figure 10:
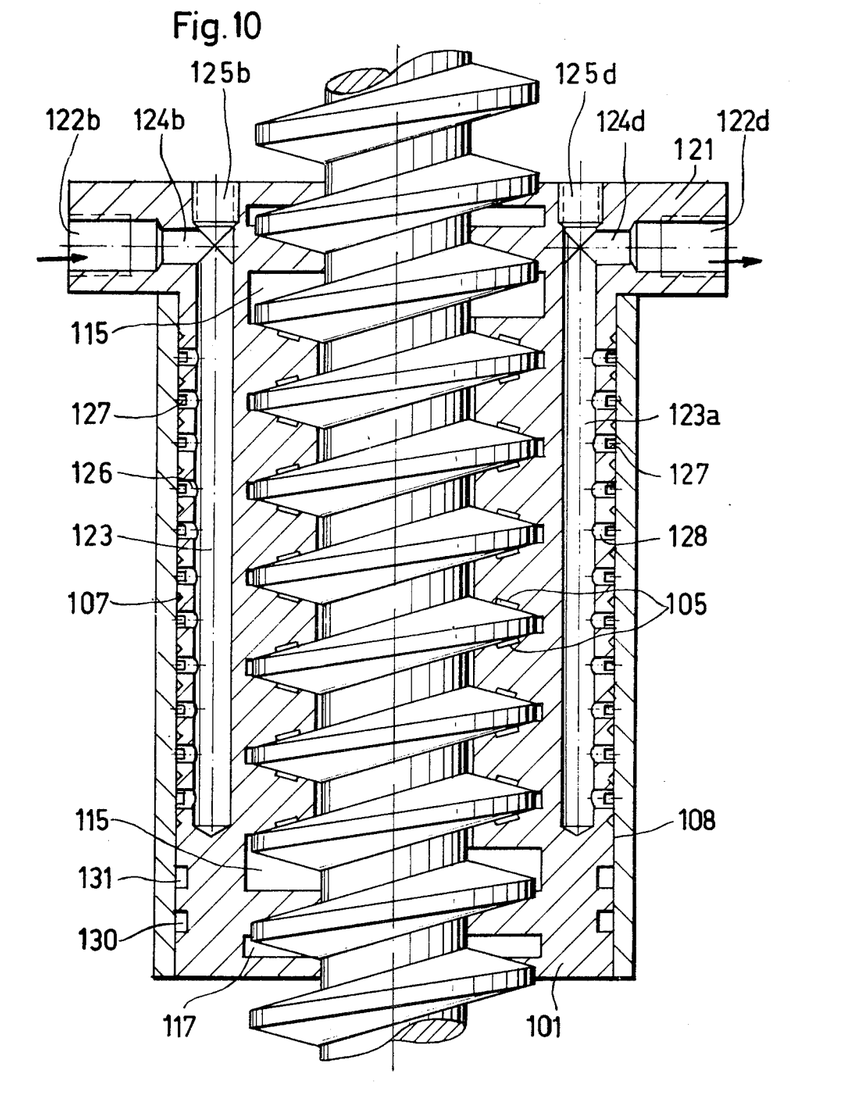
FIG. 10 is a view in accordance with FIG. 9, but with the section plane being turned to show the supply channel and a withdrawal channel for a cooling agent.

In order to prevent an issue of oil to the ends 116 of the nut 101 via the oil-catching chambers 115, between the oil-catching chambers 115 and the ends 116 of the nut 101 in each case an annular oil seal groove 117 is provided. These oil seal grooves 117 are connected via branch lines 118 to a longitudinal bore 119, which is connected to a pressure source (not shown). In this manner a pneumatic pressure is always maintained in the oil seal grooves and any leakage of oil is prevented.

The upper end of the nut 101 includes a flange 121 and connecting pieces 122a, 122b, 122c and 122d arranged radially. The connecting piece 122a is used for supplying pressurized oil from the pressure oil source, which is not shown, to the supply channel 120 (FIG. 9); the connection piece 122b is used for supplying a cooling agent to a supply channel 123 (FIG. 10); the connecting piece 122c is used for the oil return bore 114 (FIG. 11); the connecting piece 122d is used for the withdrawal channel. A connecting piece 123a is used for the cooling agent (FIGS. 10 and 12); and a connecting piece 122e is used for supplying the pneumatic pressure medium to the longitudinal bore 119 (FIG. 11). For a supply channel 129 (FIGS. 12 and 13), a further connecting piece is provided, which is not shown.

In each case a bore 124a, 124b, 124c, 124d and 124e connects to the connecting pieces 122a–122e, which bores produce the necessary connection with the channels 114, 120, 123, 123a and 119, respectively. Stoppers 125a, 125b, 125c, 125d and 125e close off certain channels, as shown.

Figure 14:
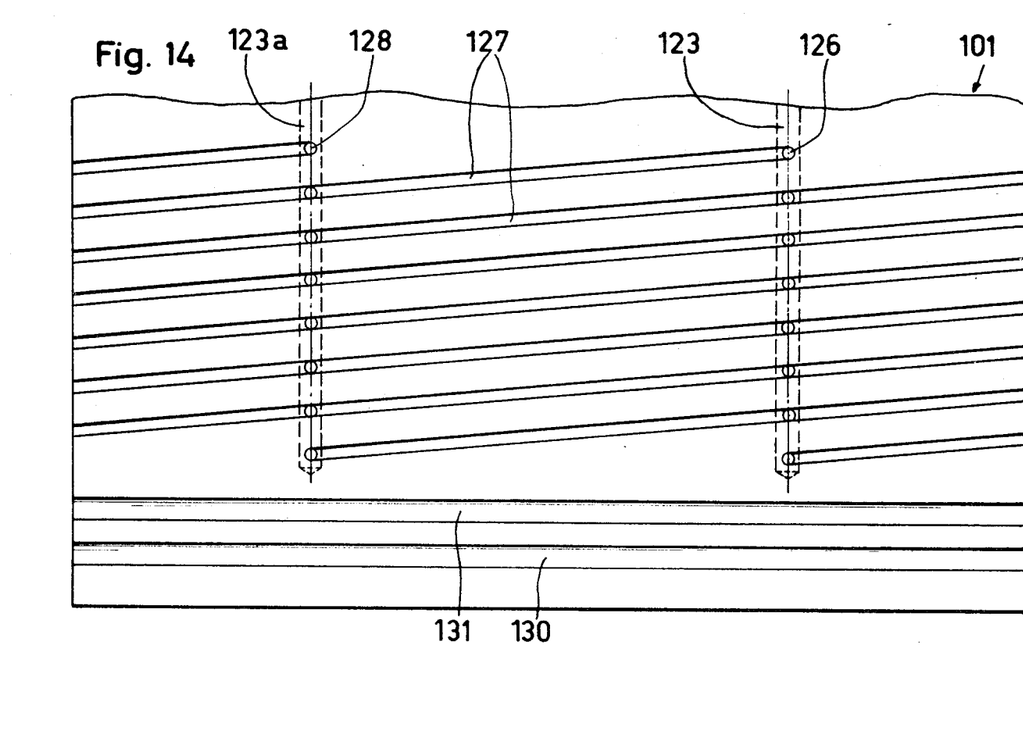
FIG. 14 is a view similar to FIG. 12, but showing only the cooling system and the distributor annular channels.

The arrangement of the cooling system can be seen from FIGS. 10 and 14. The cooling agent supplied via the supply channel 123 is supplied via cross lines 126 to cooling channels 127, which are arranged parallel to the helically circulating capillary throttles 107 in the outer periphery of the nut 101 and accordingly have the same pitch as the capillary throttles 107. The cooling agent is passed to the cooling channels 127 in both directions via a half screw thread pitch and then flows through further crosslines 128 to the withdrawal channel 123a and is from there conveyed away to the outside via the connecting piece 122d.

For better explanation, the FIGS. 13 and 14 will now be described. In the nut 101, groups of supply channels 120, 120a, 120b, 120c, or 129, 129a, 129b and 129c for oil are provided, in each case supplied from an independent source of pressurized oil, via which groups of supply channels oil pockets 105 lying opposite each other on the screw thread flanks are supplied with pressurized oil independently of each other, by interposition of the capillary throttles 107. In this connection, it is provided that all oil pockets 105 turned towards a screw thread flank are supplied by one source of pressurized oil and the oil pockets 105 turned towards the other screw thread flank are supplied by the other source of pressurized oil. The oil pockets 105 are in this connection distributed sectorwise over the periphery.

The first pressurized oil supply system consists of the supply channel 120 to which the pressurized oil is supplied via the connecting piece 122a on the flange 121. The remaining supply channels 120a, 120b, and 120c belonging to the system are distributed in radial spacing over the periphery and close at the end. They are in connection with the supply channel 120 via a closed distributor annular channel 130. The pressurized oil is supplied to the capillary throttles 107 in each case via branch channels 133 and issues at the outlet of the capillary throttles 107 via branch channels 106, into the oil pockets 105. From there the oil flows via the cross channels 113a or 113b to the oil return bore 114 or the oil return bore 114a.

The second pressurized oil supply system is provided in the same manner, the supply lines of which consist of a supply channel 129 connected to the pressure oil supply at the flange 121, a distributor annular channel 131 as well as supply channels 129a, 129b and 129c closed at the end. From these supply channels 129 or 129a, 129b, 129c, the pressure oil is supplied via the capillary throttles to the oil pockets 105, i.e., the oil pocket 105 which lies opposite the oil pockets supplied via the first pressurized oil supply system. The pressurized oil reissues from there via the oil return bore 114 or 114a. As can be seen from FIG. 14, parallel to the capillary throttles 107 there are cooling channels 127, which are supplied with cooling agent via a supply channel 123. The cooling agent enters via the crosslines 126 into the cooling channels 127 and reissues via the crosslines 128 as well as the withdrawal channel 123a.

As can be seen from FIG. 11, the cross channels 106 leading to the capillary throttles 107 are extended outwardly by the bushing 109. The resulting openings are closed by means of screw thread stoppers 134. For measuring the oil pressure in the cross channels 106 and thereby also in the oil pockets 105, the stopper 134, or several stoppers 134, may be screwed out and a pressure measurement device, likewise provided with a screw thread, may be inserted in the opening. In this manner, the oil pressure existing in the various oil pockets 105 can be measured.

There have thus been provided a method and devices which are highly effective for maintaining a pressurized oil film between relatively movable bearing surfaces and preventing leakage of oil therefrom while minimizing friction losses.

Although the invention has been described in connection with preferred embodiments, it is to be understood that various modifications are possible without departing from the spirit of the invention as defined in the claims that follow.

I claim:

1. A hydrostatic radial bearing in which a pressurized oil film is maintained between relatively rotatable bearing surfaces by supplying pressurized oil to a region between the bearing surfaces, while at the same time surrounding the said region with a pneumatic pressure threshold for preventing leakage of the oil beyond the edges of the said region, said bearing having a shaft of smooth surface rotatably carried in a hollow cylinder, the inner surface of the hollow cylinder having a radially arranged, interrupted pressurized oil supply groove (22), and oil return grooves (23) on both sides of the oil supply groove, said bearing being further characterized in that on the side of the oil return grooves (23) away from the oil supply groove (22), radial, closed oil seal grooves (24) are arranged in axial spacing and subjected to pneumatic pressure.

2. A hydrostatic axial bearing in which a pressurized oil film is maintained between relatively rotatable bearing surfaces by supplying pressurized oil to a region between the bearing surfaces, while at the same time surrounding said region with a pneumatic pressure threshold for preventing leakage of the oil beyond the edges of the said region, said bearing having a stationary bearing half and a rotatable bearing half, an intermittent oil supply groove (32) in the stationary bearing half, and annular oil return grooves (33) surrounding the oil supply groove on both sides, said bearing being further characterized in that on the sides of the oil return grooves (33) away from the oil supply groove (32) annular oil seal grooves (34) are arranged and subjected to pneumatic pressure.

3. A hydrostatic nut in which a pressurized oil film is maintained between relatively rotatable bearing surfaces by supplying pressurized oil to a region between the bearing surfaces, while at the same time surrounding the said region with a pneumatic pressure threshold for preventing leakage of the oil beyond the edges of the said region, said hydrostatic nut including a spindle inserted in the nut, said nut and spindle having screw threads with flanks forming said bearing surfaces, and oil pockets (105), and said nut being further characterized in that the oil pockets are in the oil film region which is surrounded on both sides by an annular oil seal groove (117), provided in the nut (101), and said groove is subjected to pneumatic pressure.

4. A hydrostatic nut in accordance with claim 3, characterized in that the pneumatic pressure is supplied by a medium delivered to the oil seal grooves (117) through a longitudinal bore (119) provided in the nut (101) and branch lines (118) leading transversely to the oil seal grooves (117).

5. A hydrostatic nut in accordance with claim 4, characterized in that the nut is further provided with an annular oil catching chamber (115) and an oil return bore (114).

6. A hydrostatic nut in accordance with the claim 3, characterized in that the nut (101) is provided with a plurality of oil supply channels (120, 120a, 120b, 120c), an annular distributor channel (130) connected to at least one source of pressurized oil and to the oil supply channels, branch channels (133) connected to the oil supply channels, and helically circulating capillary throttles (107) connected to the branch channels.

7. A hydrostatic nut in accordance with claim 6, characterized in that the annular distributor channel (130) is arranged in the outer periphery of the nut, and a bushing (109) surrounding the nut.

8. A hydrostatic nut in accordance with claim 6, characterized in that the annular distributor channel (130, 131) is arranged in a bushing (109) surrounding the nut (101).

9. A hydrostatic nut in accordance with claim 6, characterized in that the nut is provided with cooling channels (127) through which a cooling agent can be conveyed, said cooling channels being disposed parallel to the capillary throttles (107).

10. A hydrostatic nut in accordance with claim 6, further characterized in that a bushing is disposed about the nut and has openings communicating with the outside and ordinarily containing removable stoppers (134), and cross channels (106) in communication with said openings leading from the oil pockets (105), through the capillary throttles (107), and pressure measurement devices insertable in the openings after removal of the stoppers therefrom.

* * * * *